Figure 1:
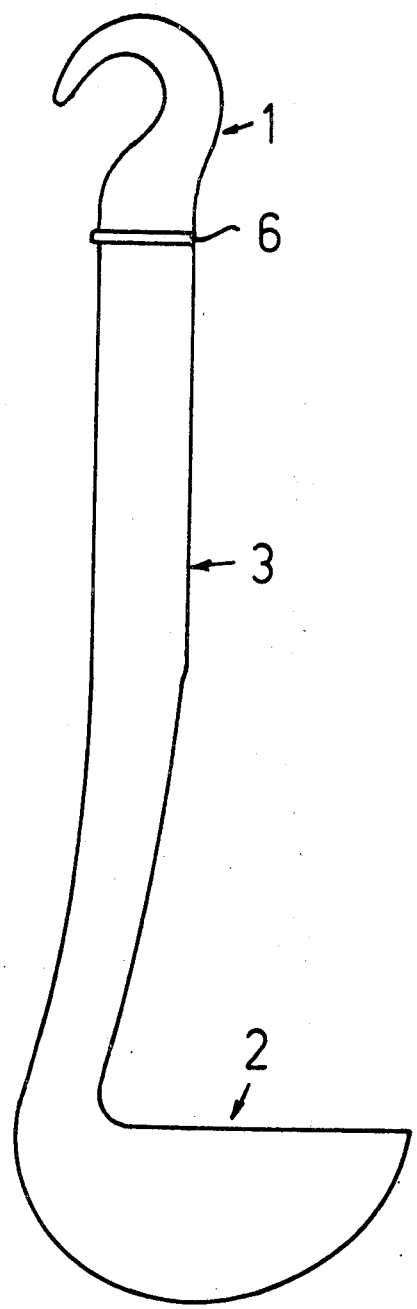

United States Patent [19]

Fishman

[11] 4,116,290
[45] Sep. 26, 1978

[54] SPOON-SHAPED SPRING SCALE

[76] Inventor: Avraham Fishman, Klosbachstr. 101, CH-8032 Zurich, Switzerland

[21] Appl. No.: 772,284

[22] Filed: Feb. 25, 1977

[30] Foreign Application Priority Data

Aug. 24, 1976 [DE] Fed. Rep. of Germany ....... 2637972

[51] Int. Cl.² .................. G01G 3/02; G01G 19/56
[52] U.S. Cl. ................................. 177/149; 177/232
[58] Field of Search .............. 177/149, 148, 147, 232, 177/168, 169

[56] References Cited

U.S. PATENT DOCUMENTS

| 202,807 | 4/1878 | Forschner | 177/232 |
| 2,113,168 | 4/1938 | Brisse | 177/147 |
| 2,129,469 | 9/1938 | Hedges | 177/232 X |

FOREIGN PATENT DOCUMENTS 661,185 8/1950 Netherlands ............... 177/149

Primary Examiner—Joseph W. Hartary
Attorney, Agent, or Firm—Thomas W. Speckman

[57] ABSTRACT

A spoon-shaped spring scale having a hollow handle on one end and a closed spoon-shaped bowl for the material to be weighed on the other end, a tube-shaped housing telescopically sliding within the hollow handle with a tension spring scale within the hollow handle and housing. The spoon-shaped spring scale may have an exchangeable dial calibrated in grams or in calories or in nutritional value for weighing various materials placed within a spoon-shaped bowl.

6 Claims, 9 Drawing Figures

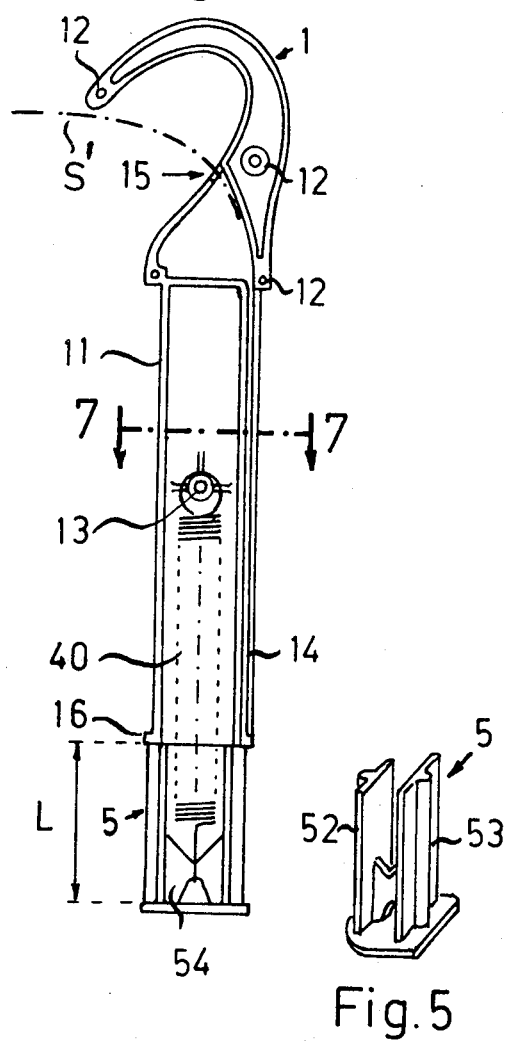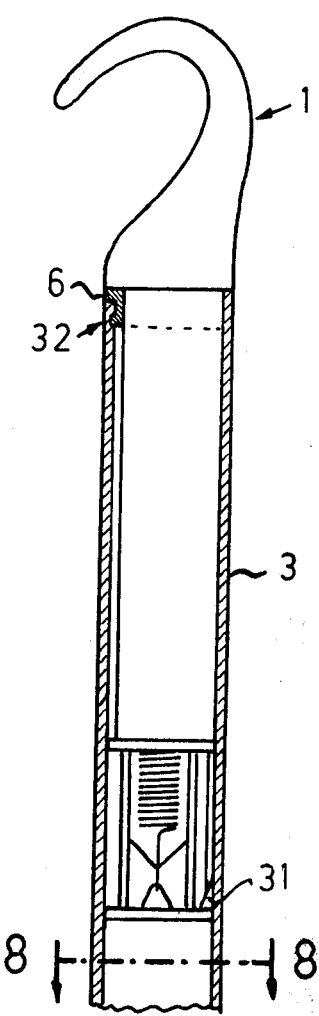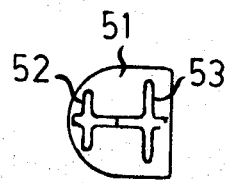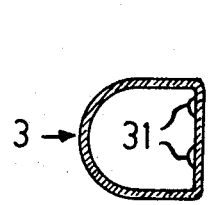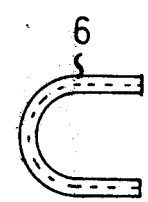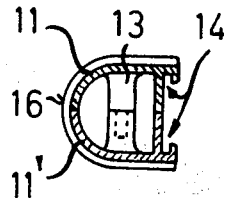

SPOON-SHAPED SPRING SCALE

This invention relates to a spoon-shaped spring scale having a tube-like handle closed on the spoon end and a tube-shaped housing part which slides telescopically in the handle, these parts together enclosing a tension spring.

The handle is closed on the spoon end so that during the use of the spoon liquid to be weighed will not penetrate into the hollow space in which the spring scale is located. For hygienic reasons, too, it is desirable that the handle is closed at the bottom and can be cleaned easily.

This desirable shape, per se, offers certain difficulties with respect to the mounting of the tension spring which is to be placed and fastened in the spoon handle, especially since this spring should be mounted with initial tensional force which corresponds approximately to the self-weight of the spoon.

It is an object of the invention to overcome in a simple and elegant manner these difficulties which occur during the assembly.

According to the invention, this problem is solved in such a way that one end of the tension spring is fastened in the tube-shaped part with the suspension component at one end whereas the other end of said spring is fastened on a slide-in spring securement part which jointly with the tube-shaped housing part can be slid into the tube-shaped spoon handle and is locked there so that it is undetachable.

It is of advantage for the slide-in spring securement part to have guide components whose length is such that the spring forces the slide-in spring securement part onto the end of the tube-shaped housing part provided with the suspension component to facilitate the assembly. As far as possible, this initial tensional spring force should correspond to the self-weight of the spoon part.

Figure 2:
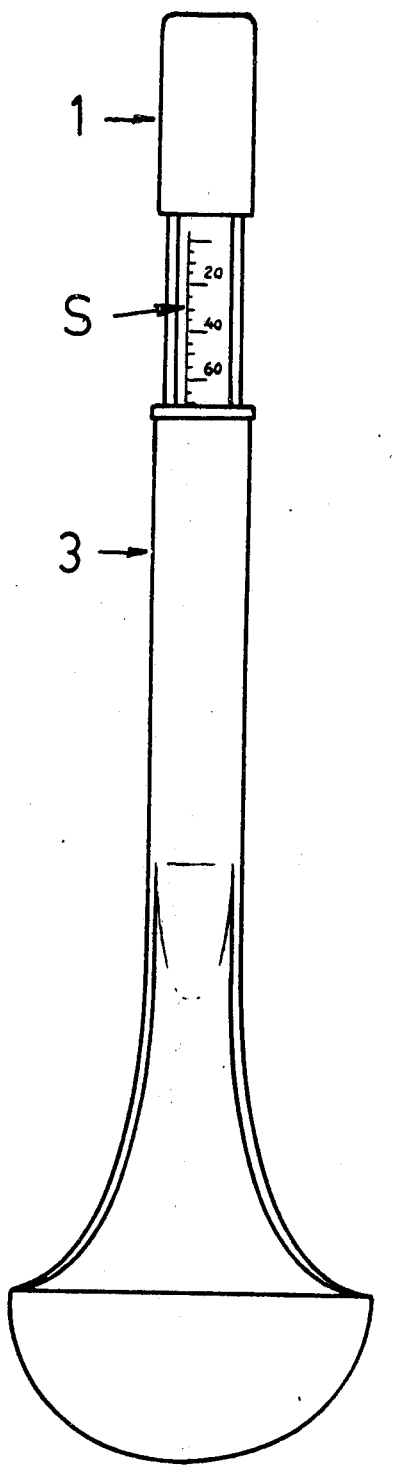

An embodiment of the invention is shown in the drawings wherein is shown:

FIG. 1 a side view of a spoon-shaped spring scale;
FIG. 2 the scale of FIG. 1 seen from the front;
FIG. 3 the final assembled scale part before its installation in the spoon handle;
FIG. 4 a section through the spoon handle with the scale part installed;
FIG. 5 the slide-in spring securement part as a perspective illustration;
FIG. 6 the slide-in part of FIG. 5 in a top view;
FIG. 7 is a section along line 7—7 shown in FIG. 3;
FIG. 8 a section along line 8—8 shown in FIG. 4; and
FIG. 9 a stop lever.

From the exterior, the spoon-shaped scale looks like a normal ladle, except the edge of the spoon runs about at right angles to the handle as can be seen in FIGS. 1 and 2. In FIG. 2, the spoon is shown during weighing. During the weighing, the spoon is held by the hook-shaped suspension component and in the spoon there is, for instance, 70 grams of rice and this may be read on the dial S.

All parts, except the tension spring, may be made of plastic. The spoon proper 2 with its tube-shaped handle 3 is one-piece whereas the scale part, which is yet to be described, is composed of several parts.

The construction and the assembly of the scale part will be explained with reference to FIGS. 3-9.

The hook-shaped suspension component 1 is connected with the tube-shaped housing part 11. For reasons of production, these parts are designed as half shells 11 and 11' which are held together by means of pins 12 formed on one half shell and bores formed on the other half shell. For reasons of clarity, the front half shell 11' is omitted in FIG. 3. One of the pins 13 serves simultaneously for the holding of upper end of the tension spring 40.

The cross section of the tube-shaped housing part 11 as well as of the spoon handle 3 is flat on the dial side and semicircular on the backside as shown in FIGS. 7 and 8.

The edges of the tube-shaped housing part 11 have on the dial side two lengthwise grooves 14 which serve to hold the dial. The dial itself consists of a printed flexible plastic strip. The dial is exchangeable. For this purpose there is arranged in the hook-shaped grip part of the handle slot 15 which with a curved wall arranged in the grip part is aligned and in communication with grooves 14. The flexible dial can therefore be slid into position or removed as is shown by the dash-dotted line S' in FIG. 3.

The lower end of the tension spring 40 must be fastened within handle 3 so that the scale can function. The slide-in spring securement part 5, in which the lower end of the spring is fastened as shown in FIG. 3, serves this purpose. The slide-in spring securement part permits the complete assembly of the actual scale part and the sliding of said scale part in its assembled state into the tube-shaped handle 3 where it engages behind projections 31 as it is shown in FIG. 4.

The slide-in spring securement part includes bottom plate 51 whose shape corresponds to the interior contour of the handle 3. At right angle to the bottom plate 51, there are arranged guide components in form of two walls 52 and 53, which are reinforced by ribs and guide the slide-in spring securement part while it slides into the hollow handle of the spoon so that it will not tilt. Between the walls 52 and 53 there extends a bridge 54 which is X-shaped when observed from the side and on whose narrowest portion the lower hook of the spring 40 is fastened. The length L of the guide components 52 and 53 is selected in such a way that in the assembled state of parts 11, 11' and 5 the spring 40 is under tension such that its tension here corresponds approximately to the weight of the spoon 2 with its handle 3.

When the assembled scale part is slid into the handle 3, care must be taken that the spring 40 is not overstressed. This means that the tube-shaped part 11 with its hook-shaped grip part 1 should have a stop which prevents pulling out from the handle. For this purpose, parts 11 and 11' have a collar 16 on the lower end and a horsehoe-shaped stop 6 (FIG. 9) is arranged in the upper end of the handle 3. Inside the handle 3, a shallow groove 32 is arranged in which collar part 6 engages.

Instead of joining parts 11 and 11' by means of pins, one can join these parts also by gluing them together. The same is true for stop part 6.

Since the dial is exchangeable, it can be calibrated also in calories in place of grams according to the nutritional value of different substances. If desired, the dial can be set for the exact zero value (self-weight of the spoon and handle) by shifting it within grooves 14.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A spoon-shaped spring scale comprising a tube-shaped hollow handle merging into the bowl of a spoon, a tube-shaped movable calibrated scale member slidingly arranged within said handle the outer end of said movable scale member having suspension means, a tension spring being located inside said movable scale member and said hollow handle one end of said spring being secured to said movable scale member the other end of said spring being secured to said hollow handle, said hollow handle having an inside projection engagable with a separate slide-in spring securement part to which the end of said spring secured to said hollow handle is fastened, said spring securement part being pushed into said hollow handle until it passes said projection where it is held by irreversible engagement with said projection and the upper edge of said hollow handle providing the outer housing for the scale with its upper rim providing a reading mark for said calibrated scale member.

2. A spring scale as defined in claim 1, characterized by said slide-in spring securement part having guide parts whose length is selected so that the mounted spring forces the slide-in spring securement part against the lower end of the tube-shaped housing.

3. A spring scale as defined in claim 2, characterized by the length of said guide parts being selected so that the tensional force of the mounted spring corresponds approximately to the self-weight of the hollow handle and spoon bowl.

4. A spring scale as defined in claim 1, characterized by the tube-shaped housing being provided with a suspension part and is equipped with an exchangeable dial.

5. A spring scale as defined in claim 4, characterized by the dial being adjustable on said tube-shaped housing.

6. A spring scale as defined in claim 4, characterized by an exchangeable dial calibrated in grams or in calories or in nutritional value for different food materials.

* * * * *